United States Patent
Mital et al.

(10) Patent No.: US 8,964,530 B2
(45) Date of Patent: Feb. 24, 2015

(54) INCREASING MULTI-DESTINATION SCALE IN A NETWORK ENVIRONMENT

(71) Applicants: Bhuvan Mital, Santa Clara, CA (US); Rajagopal Subramaniyan, San Jose, CA (US); Narasimhan Gomatam Mandeyam, San Jose, CA (US)

(72) Inventors: Bhuvan Mital, Santa Clara, CA (US); Rajagopal Subramaniyan, San Jose, CA (US); Narasimhan Gomatam Mandeyam, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 99 days.

(21) Appl. No.: 13/755,829

(22) Filed: Jan. 31, 2013

(65) Prior Publication Data
US 2014/0211793 A1 Jul. 31, 2014

(51) Int. Cl.
*H04L 12/00* (2006.01)
*H04L 12/707* (2013.01)

(52) U.S. Cl.
CPC ..................................... *H04L 45/22* (2013.01)
USPC ........... 370/218; 370/220; 370/389; 370/401; 709/223

(58) Field of Classification Search
None
See application file for complete search history.

(56) References Cited

U.S. PATENT DOCUMENTS

| | | | |
|---|---|---|---|
| 2007/0268903 A1* | 11/2007 | Nakagawa | 370/392 |
| 2011/0273988 A1* | 11/2011 | Tourrilhes et al. | 370/237 |
| 2013/0227672 A1* | 8/2013 | Ogg et al. | 726/12 |
| 2014/0044129 A1* | 2/2014 | Mentze et al. | 370/390 |

OTHER PUBLICATIONS

Cisco Systems, Inc., "Unify Virtual and Physical Networking with Cisco Virtual Interface Card," © 2011, 9 pages; cisco.com/en/US/prod/collateral/modules/ps10277/ps10331/white_paper_c11-618838.html.

* cited by examiner

*Primary Examiner* — Chi H Pham
*Assistant Examiner* — Shick Hom
(74) *Attorney, Agent, or Firm* — Patent Capital Group

(57) ABSTRACT

An example method for increasing multi-destination scale in a network environment is provided and includes receiving a packet at a pair of switches comprising a first switch and a second switch in a network environment, where the first switch is configured as an elected forwarder, and the second switch is configured as a standby forwarder. A fabric extender (FEX) is connected to the first switch and the second switch with a virtual PortChannel. The method further includes forwarding the packet to a host connected to the FEX. The elected forwarder is configured with substantially all multi-destination virtual interfaces (VIFs) on the FEX in a forwarding table. The standby forwarder forwards the packet to the elected forwarder. In specific embodiments, the elected forwarder programs the FEX with the VIFs.

18 Claims, 6 Drawing Sheets

| MULTICAST FORWARDING TABLE ON FEX {30} | | | |
|---|---|---|---|
| | REGION | VIF | OIF |
| *PROGRAMMED BY SWITCH 2* | 0 TO 4k - 1 | 10 (FOR MCASTGRP-1) | eth101/1/1, eth101/1/32 |
| | | | |
| | | | |
| | | | |

| BROADCAST FORWARDING TABLE ON FEX {32} | | | |
|---|---|---|---|
| | REGION | VIF | OIF |
| *PROGRAMMED BY SWITCH 2* | 0 TO 4k - 1 | 10 (FOR VLAN 100) | eth101/1/1, eth101/1/32 |
| | | | |
| | | | |
| | | | |

FIG. 3

INCREASING MULTI-DESTINATION SCALE IN A NETWORK ENVIRONMENT

TECHNICAL FIELD

This disclosure relates in general to the field of communications and, more particularly, to increasing multi-destination scale in a network environment.

BACKGROUND

Data centers are increasingly used by enterprises for collaboration and for storing data and/or resources. A typical data center network contains myriad network elements, including hosts, load balancers, routers, switches, etc. The network connecting the network elements provides secure user access to data center services and an infrastructure for deployment, interconnection, and aggregation of shared resource as required, including applications, hosts, appliances, and storage. Improving operational efficiency and optimizing utilization of resources in data centers are some of the challenges facing data center managers. Data center managers want a resilient infrastructure that consistently supports diverse applications and services and protects the applications and services against disruptions. A properly planned and operating data center network provides application and data integrity and optimizes application availability and performance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 3 is a simplified diagram illustrating other example details of the communication system in accordance with one embodiment;

DETAILED DESCRIPTION OF EXAMPLE EMBODIMENTS

Overview

An example method for increasing multi-destination scale in a network environment includes receiving a packet (e.g., a multi-destination packet) at a pair of switches (e.g., at an interface of either of the switches, or at a common interface, etc.). The pair may include a first switch and a second switch, where the first switch is configured as an elected forwarder, and the second switch is configured as a standby forwarder. A fabric extender (FEX) is connected to the first switch and the second switch with a virtual PortChannel (vPC) (e.g., in an active/active topology). The method further includes forwarding (e.g., by the elected forwarder), the packet to a host connected to the FEX. The elected forwarder (e.g., but not the standby forwarder) is configured with substantially all multi-destination VIFs programmed on the FEX's forwarding table. The standby forwarder forwards the multi-destination packet to the elected forwarder.

In specific embodiments, the elected forwarder, and not the standby forwarder, programs the FEX with the multi-destination VIFs. In various embodiments, the elected forwarder is elected based on a vPC role, for example, a primary role. In specific embodiments, the first switch and the second switch do not perform any VIF synchronization. The standby forwarder may self-manage multi-destination VIFs without any dependency on the elected forwarder. In some embodiments, upon failure of the elected forwarder, the standby forwarder takes on a role of the elected forwarder and programs the FEX with its locally cached multi-destination VIFs.

Example Embodiments

Figure 1A:
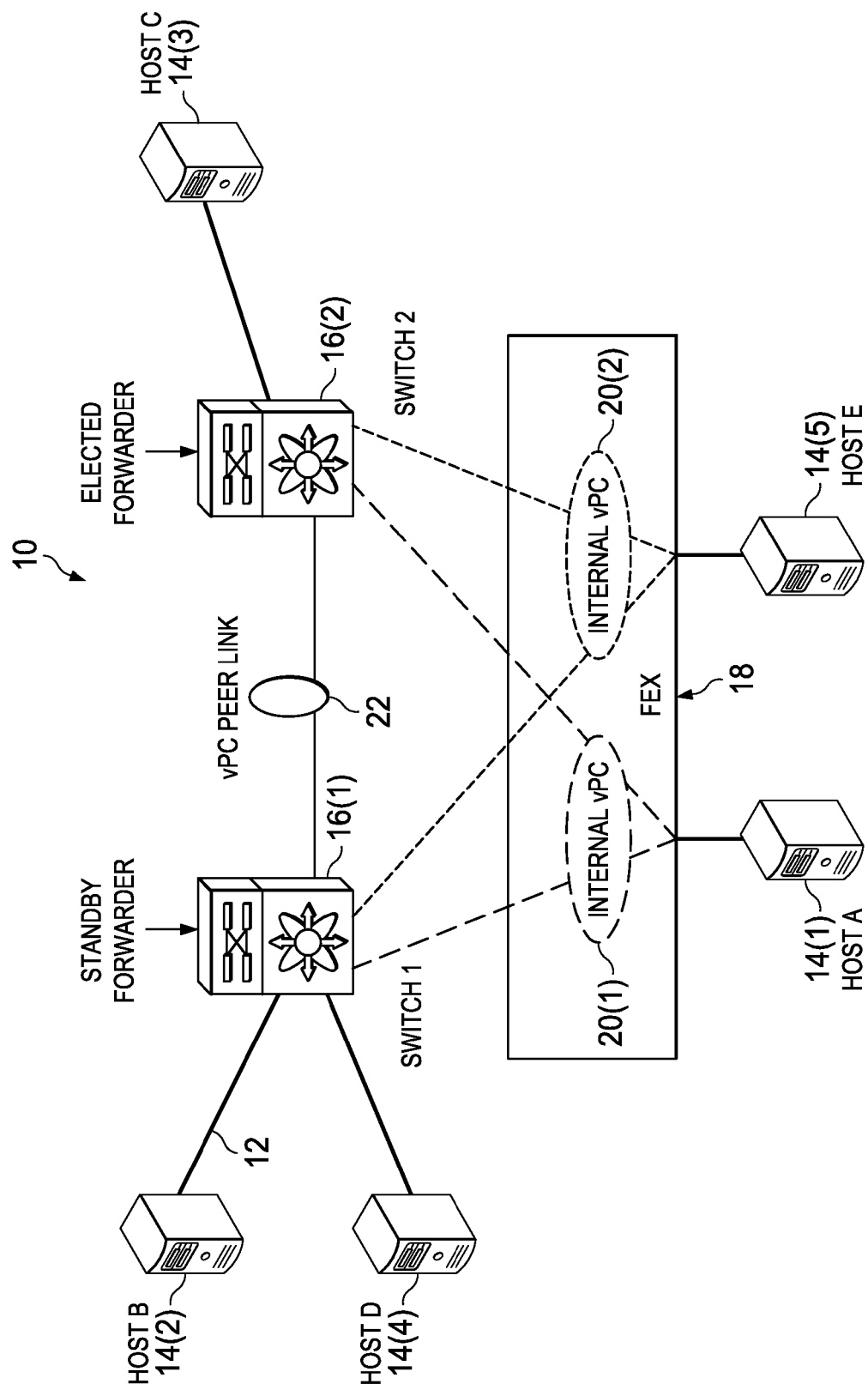
FIG. 1A is a simplified block diagram illustrating a communication system for increasing multi-destination scale in a network environment.

Turning to FIG. 1A, FIG. 1A is a simplified block diagram illustrating an embodiment of communication system 10 for increasing multi-destination scale in a network environment. Communication system 10 includes a network 12 (generally indicated by an arrow) comprising hosts 14(1)-14(5). In the example network architecture, a pair of switches, 16(1) and 16(2) may be connected to some of the hosts (e.g., hosts 14(1) and 14(5)) over a fabric extender (FEX) 18. In various embodiments, FEX 18 may be connected by a virtual PortChannel (vPC) in an active/active topology with switches 16(1) and 16(2). Each of FEX host interfaces (HIFs) to hosts 14(1) and 14(5) may be conceptualized as internal vPCs 20(1) and 20(2), respectively. Switches 16(1) and 16(2) may be coupled over a vPC peer link 22 that serves to synchronize information between them for purposes of the vPC connection with FEX 18.

As used herein, the term "switch" can include any network element configured to receive packets from a source (e.g., host 14(4)) and forward the packets appropriately to a destination (e.g., host 14(1)) in a network (e.g., network 12). Network elements can include computers, network appliances, servers, routers, switches, gateways, bridges, load balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

As used herein, the term "fabric extender" includes a pass-through/multiplexer network element that enhances connectivity of the switches (e.g., switches 16(1) and 16(2)) by increasing the number of hosts (e.g., hosts 14(1) and 14(5)) that can be connected through the switches. FEX 18 may have no capability to store a forwarding table or run any control plane protocols. Instead, FEX 18 may rely on one or both switches 16(1) and 16(2) to forward packets from hosts 14(1)-14(5). All traffic received from FEX 18's host side interfaces may be forwarded to connected switches 16(1) and 16(2) even if the traffic is being forwarded between two hosts 14(1) and 14(5) connected to the same FEX 18. From a management perspective, FEX 18 may be modeled as a remote linecard, with configurations set, managed and stored at switches 16(1) and 16(2).

As used herein, the term "host" includes a computing device connected to a network (e.g., network 12). Examples of hosts include servers, laptops, desktops, and smartphones. Hosts may provide data, services, applications and other such information resources to users and other nodes (e.g., any electronic device, client, server, peer, service, application, or other object capable of sending, receiving, or forwarding information over communications channels) on the network.

The term "virtual PortChannel" refers to a communication link wherein links (e.g., Ethernet connections) that are physically connected to two different network elements (e.g., switches 16(1) and 16(2)) appear as a single PortChannel (e.g., a single logical interface comprising an aggregation of multiple physical interfaces) to a third device (FEX 18). The vPC can provide Layer 2 multipathing, which allows redundancy by increasing bandwidth, enabling multiple parallel paths between nodes and load-balancing traffic where alternative paths exist. The two network elements coordinate over a dedicated link (called vPC peer link) to ensure correct protocol/forwarding behavior, even when failures happen. In the FEX active/active topology, both switches 16(1) and 16(2) can configure and manage FEX 18 independently. The software configuration state (FEX image) can be downloaded by FEX 18 from either of switches 16(1) and 16(2). "Internal vPC" refers to a logical vPC in FEX 18 configured for a directly attached host (e.g., host 14(1) and host 14(5)) and pinned to the fabric vPC between FEX 18 and switches 16(1) and 16(2). Thus, the vPC connection from FEX 18 to switches 16(1) and 16(2) may be assigned to vPC 20(1) for host 14(1), and to vPC 20(2) for host 14(5).

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

FEXes are generally configured to simplify data center access architecture and operations. FEX architecture can provide a highly scalable unified server-access platform across a range of 100 Megabit Ethernet, Gigabit Ethernet, 10 Gigabit Ethernet, unified fabric, copper and fiber connectivity, rack, and blade server environments (among others). The FEX platform can ideally support traditional Gigabit Ethernet while allowing transparent migration to 10 Gigabit Ethernet, virtual machine-aware unified fabric technologies.

Typical FEXes behave as remote line cards for the 'parent' switch. The fabric extenders are essentially extensions of the parent switch fabric, with the fabric extenders and the parent switch together forming a distributed modular system. The FEXes connect to the parent switch through fabric links, such as copper cable, short-reach or long-reach optics, and appropriate FEX Transceivers. Working in conjunction with switches, the FEXes extend the capabilities and benefits offered by the parent switch while providing flexible, scalable, and cost-effective server access. The architecture enables physical topologies with the flexibility and benefits of both top-of-rack (ToR) and end-of-row (EoR) deployments.

Device configurations of the FEXes are typically managed on the parent switch, and configuration information is downloaded to the FEX using in-band communication. Unlike the link between two traditional switches, the uplink from FEX to the parent switch is not an 802.1Q trunk—traffic is not identified or isolated using VLAN tags. Rather, frames are marked with a VN-Tag that identifies the FEX port. When the FEX is uplinked to the parent, a unique tag ID is allocated for each host interface on the FEX. The parent and FEX mark each frame sent across the uplink with the appropriate tag. The FEX host ports logically appear on the parent switch, and behave just like physical ports on the parent switch. The VN-Tag acts like a virtual wire that connects the FEX host port directly to the parent switch.

When the FEX is connected to a pair of switches in vPC with active/active topology, both switches can configure and manage the FEX independently. Both switches can configure the FEX identically (e.g., FEX identifier may be the same on both switches). Configuration of host facing ports (also called satellite ports) and host facing PortChannels (also called satellite PortChannels) on both switches may be the same. Both switches may have the same operational view of the satellite ports and the PortChannels. If interface bring-up fails on one switch, then the interface remains down on the other switch as well. Similarly, if one switch shuts down a host interface (also called as virtual interface (VIF)), then the host interface may be brought down on the other switch too.

Typically, multicast indices (such as multi-destination VIFs) are used for flooding unknown Unicast traffic, broadcast traffic, multicast traffic in a virtual local area network (VLAN) and for sending IP multicast traffic on a subset of ports in the VLAN. (VLANs are logical groupings, divisions or subsets of a local area network (LAN); there may be one or more VLANs in a single LAN). The Unicast, multicast and broadcast flood lists are created when a VLAN is created and updated when a logical interface (LIF), such as a VIF, is added to the VLAN. Flood lists for sending IP multicast is created and updated by snooping Internet Group Management Protocol (IGMP) messages from routers and hosts. Typically, two internal VLANs are used for a single external VLAN: one internal VLAN is used for multi-chassis trunk (MCT) ports (MCT internal VLAN), and another internal VLAN is used for non-MCT ports (non-MCT internal VLAN). (MCT refers to the vPC peer link). Each internal VLAN has its own multicast, broadcast and unknown Unicast flood lists, and each (*, g) multicast domain is typically replicated in the VLANs configured on both the switches.

Thus, each multicast route requires two entries in the multicast routing table; consequently, the multicast routing table size is half the size of what is supported in topologies where vPC is not enabled. For example, a multi-destination forwarding index table of N entries (N=4K for most typical FEXes) is associated with each FEX. Every multi-destination VIF on the FEX expands to a list of outgoing interfaces (OIF) or ports of exit. Typically, the multi-destination index table on the dual-homed FEX is programmed by both the switches. To avoid conflicting multi-destination entries associated with the FEX, the multi-destination index table may be split between the two switches into two pools and multicast indices from different pools are allocated on each switch. As two multi-destination indices are used for every flood list in a VLAN or (*, g) multicast domain, this approach reduces the multi-destination index table space associated with the FEX to one fourth the available space (e.g., 1K).

The available space can be increased to 2K multi-destination indices in some cases by programming the multi-destination indices used for multicast internal VLANs in the 2K multi-destination space that is not used by the switch on the server side. For example, the multi-destination index corresponding to the MCT internal VLAN may not be programmed for the FEX (as the MCT ports correspond to the vPC peer link between the two switches). If one of the switches uses the lower 2K multi-destination indices, higher 2K multi-destination indices on that switch can be used for programming flood indices on MCT internal VLANs as the MCT internal VLANs will not have any associated FEX ports. This can allow up to 2K different flood lists to be programmed for each switch instead of 1K. For example, VIFs numbered 0 to 2K−1 are programmed by the primary switch, and VIFs numbered 2K to 4K−1 are programmed by the secondary switch.

Nevertheless, such FEX active/active implementations impose a limitation on multi-destination scale numbers by dividing the multi-destination indices evenly between the two peer switches that control the FEX, thereby reducing the supported number of multicast groups and VLANs on FEX interfaces to half. Moreover, both switches program the multi-destination VIFs in the multi-destination forwarding index table associated with the FEX. Only N/2 (typically 2K) multi-destination traffic can be supported for FEX active/active interfaces. Only N/2 entries in the multi-destination forwarding index table are available to each switch for programming. Moreover, there is no reduction in usage of vPC peer-link traffic and a copy of multicast packets or broadcast flood packets has to go over the vPC peer-link between the two switches.

Communication system 10 is configured to address these issues (and others) in offering a system and method for scaling IPv6 addresses in a network environment. In various embodiments, one of the pair of switches (e.g., switch 16(2)) may be configured as an "elected forwarder," and the other switch (e.g., switch 16(1)) may be configured as a "standby forwarder." As used herein, the term "elected forwarder" refers to a switch (e.g., switch 16(2)) that is configured to forward multi-destination packets to hosts attached to a FEX (e.g., FEX 18) configured by the switch, where the FEX is connected to the switch in a vPC with active/active topology; "standby forwarder" refers to the switch other than the elected forwarder in the vPC pair of the FEX.

FEX 18 may be fully managed for multi-destination functions as part of the elected forwarder, namely, switch 16(2). The elected forwarder selection may be based on a vPC role (e.g., primary role). The elected forwarder, but not the standby forwarder, may forward substantially all multi-destination traffic going to FEX 18. Unicast traffic may be unaffected by the elected forwarder/standby forwarder designation. In various embodiments, the elected forwarder can program a full range of VIFs on FEX 18 for multi-destination traffic. Host interfaces of FEX 18 can support substantially a full range of VLANs or multicast groups (e.g., 4K for most FEXes). There may be no need for VIF coordination between the peer switches 16(1) and 16(2).

According to various embodiments, the standby forwarder switch 16(1) may self-manage multi-destination VIFs without any dependency on elected forwarder switch 16(2). Standby forwarder switch 16(1) may maintain a software VIF state in memory; however the standby forwarder may not perform any FEX programming. On failure of switch 16(2), which functions as the elected forwarder, the standby forwarder can take over the role of the elected forwarder and program FEX 18 with its locally cached multi-destination VIF information. Embodiments of communication system 10 can double the scale of allowed multi-destination groups supported for FEX interfaces, without increasing the usage of vPC peer-link or the FEX fabric fail-over time (e.g., vPC convergence).

In various embodiments, HIF ports can be statically pinned to the NIF ports (e.g., fabric ports on switches 16(1) and 16(2)) or to a NIF port channel (e.g., fabric port channel between FEX 18 and switches 16(1) and 16(2)). Hashing of traffic on the port channels to individual member ports may be performed on suitable processors (e.g., application specific integrated circuits (ASICs) on FEX 18. In active/active topology, when the port channel between FEX 18 and switches 16(1) and 16(2) is created, internal vPCs (e.g., vPCs 20(1) and 20(2)) corresponding to various hosts attached to FEX 18 may be simultaneously generated.

Figure 1B:
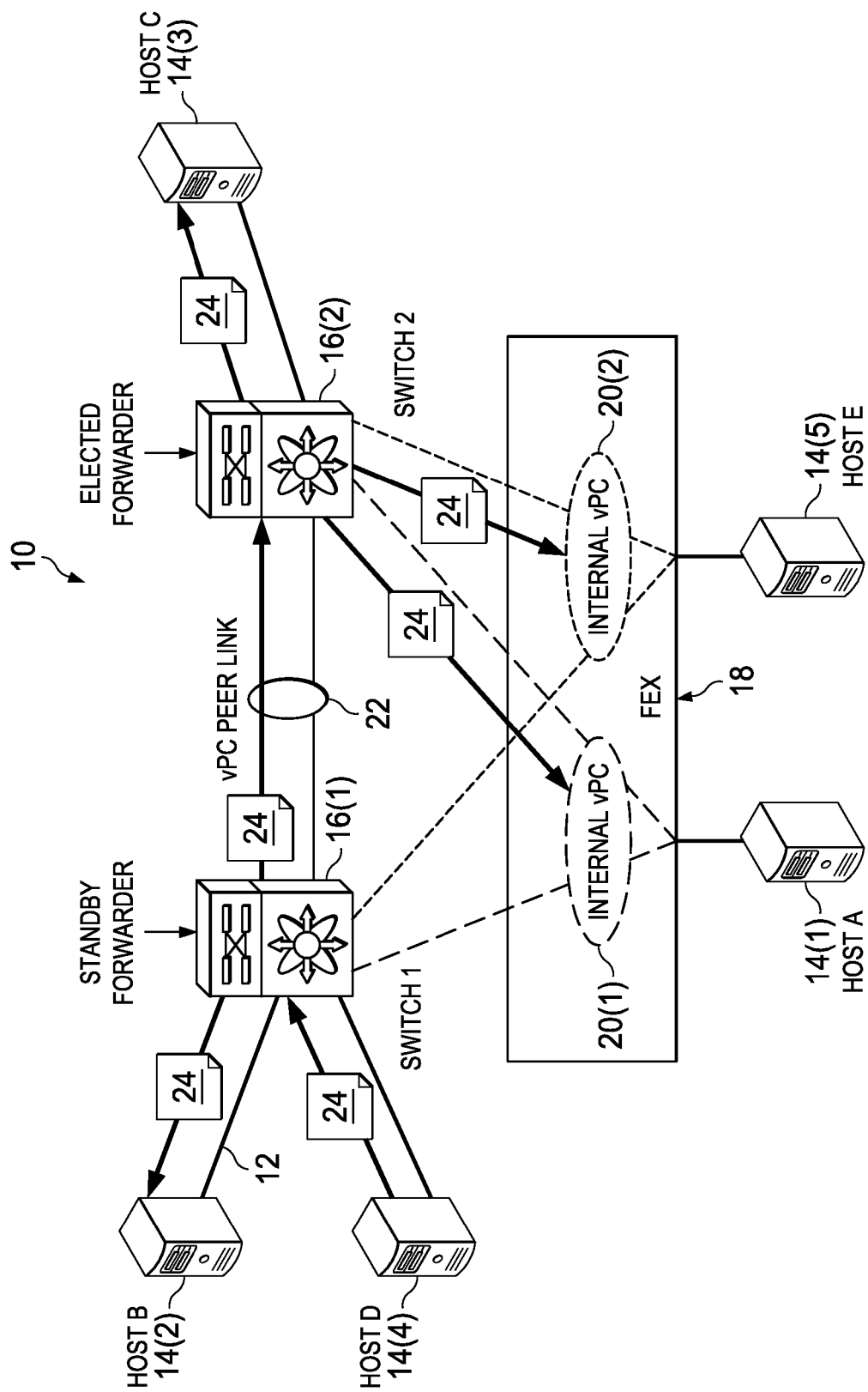
FIG. 1B is a simplified block diagram illustrating example details of the communication system in accordance with one embodiment.

Turning to FIG. 1B, FIG. 1B is a simplified block diagram illustrating multi-destination forwarding according to an embodiment of communication system 10. During operation, assume that host 14(4) (e.g., host D) sends a multi-destination packet 24 in network 12. As used herein, the term "packet" refers to a unit of communication over a network. Packets can vary in structure depending on the protocol used; for example, on an Ethernet network, data is transmitted in Ethernet frames. A multi-destination packet such as packet 24 is destined to multiple destinations, and can include, by way of examples, and not limitations, multicast packets destined to one or more hosts in a specific multicast group, and broadcast packets destined to one or more hosts in a specific VLAN. In one example scenario, multi-destination packet 24 may be a multicast packet destined to members of multicast group 1. In another example scenario multi-destination packet 24 may cause a flood on standby forwarder switch 16(1) on a specific VLAN (e.g., VLAN 100).

Standby forwarder switch 16(1) may forward copies of multi-destination packet 24 to hosts (e.g., host 14(2)) that are not connected via vPC or FEXes and are members of the specific multicast group or VLAN. A copy of packet 24 destined to hosts (e.g., hosts 14(1) and 14(5)) connected via FEX 18 may be forwarded to elected forwarder switch 16(2). Elected forwarder switch 16(2) (and not standby forwarder switch 16(1)) may replicate and forward multi-destination packet 24 to hosts 14(1) and 14(5) connected via FEX 18 according to a suitably configured multi-destination forwarding table (e.g., multicast table or broadcast table). Thus, although hosts 14(1) and 14(5) are connected to standby forwarder switch 16(1), switch 16(1) may not forward multi-destination packet 24 to hosts 14(1) and 14(5); rather, elected forwarder switch 16(2) may receive multi-destination packet 24 from standby forwarder switch 16(1) and forward it on to hosts 14(1) and 14(5). Thus, the scale of allowed multi-destination groups supported for FEX interfaces is approximately doubled and comparable to a configuration wherein FEX 18 is not connected to switches 16(1) and 16(2) in a vPC with active/active topology.

Turning to the infrastructure of communication system 10, the network topology can include any number of servers, virtual machines, switches (including distributed virtual switches), routers, and other nodes inter-connected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications.

Additionally, any one or more of these elements may be combined or removed from the architecture based on particular configuration needs. Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration. Moreover, communication system 10 can include any number of switches and hosts within the broad scope of the present disclosure.

The example network environment may be configured over a physical infrastructure that may include one or more networks and, further, may be configured in any form including, but not limited to, LANs, wireless local area networks (WLANs), VLANs, metropolitan area networks (MANs), wide area networks (WANs), virtual private networks (VPNs), Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet). Network 12 may represent any type of network, including Internet, enterprise networks, cloud networks, etc.

In various embodiments, switches 16(1) and 16(2), and FEX 18 may include suitable hardware and software to perform the operations described herein. For example, switches 16(1) and 16(2) may include suitable control plane processors, memory elements, network interfaces, and other components to enable connectivity to FEX 18, and program switches 16(1) and 16(2) to forward multi-destination packets to FEX 18 appropriately.

Figure 2:
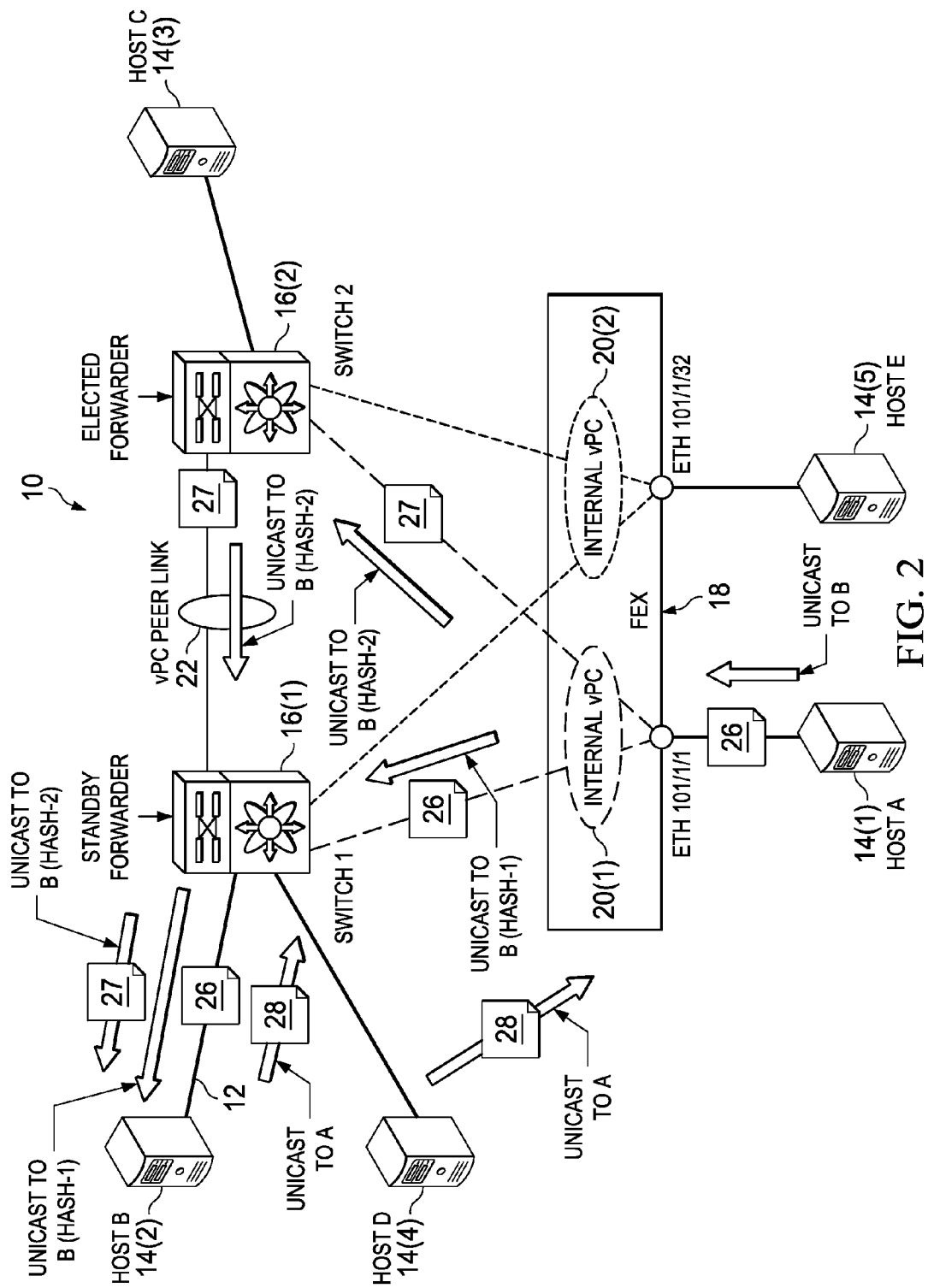
FIG. 2 is a simplified block diagram illustrating example details of the communication system in accordance with one embodiment.

Turning to FIG. 2, FIG. 2 is a simplified block diagram illustrating additional details of communication system 10. A Unicast packet 26 may be sent by host 14(1) destined to host 14(2). Unicast packet 26 may be sent over vPC 20(1) according to two hashes (e.g., hash 1 and hash 2), with each hash being selected for a specific one of switches 16(1) and 16(2). For example, Unicast packet 26 may be sent to switch 16(1) according to hash 1. Switch 16(1) may forward Unicast packet 26 to host 14(2) as appropriate. Unicast packet 26 may be sent to switch 16(2) as packet 27 according to hash 2. Packet 27 may be sent across peer link 22 to switch 16(1), as host 14(2) is connected to switch 16(1). Switch 16(1) may forward packet 27 to host 14(2), as appropriate. Another Unicast packet 28 (e.g., in response to packet 26 or 27) may be sent by host 14(2) destined to host 14(1). Switch 16(1) may forward Unicast packet 28 directly to host 14(1) over FEX 18 without forwarding packet 28 to elected forwarder switch 16(2). Thus, according to some embodiments, Unicast packets may behave no differently from configurations without elected forwarder and standby forwarder.

Turning to FIG. 3, FIG. 3 is a simplified diagram illustrating example forwarding tables associated with FEX 18. Example table 30 represents a multicast forwarding table, and example table 30, substantially all available space (e.g., allocated to 0 to 4k–1 entries) may be programmed by elected forwarder switch 16(2); VIF 10 may be programmed for example multicast group 1 at OIFs eth 101/1/1 and eth 101/1/32, corresponding to host interfaces with hosts 14(1) and 14(5), respectively. Eth 101/1/1 and eth 101/1/32 are merely labels provided to the OIFs according to a suitable nomenclature, where Eth represents an Ethernet interface; the numeral subsequent represents the chassis identifier (e.g., remote line-card number) assigned to the FEX; the numeral thereafter represents the remote slot identifier on the chassis; and the last numeral represents the port number on FEX host-facing port. Any other suitable nomenclature may be used within the broad scope of the embodiments.

Thus, unlike other systems where only half the space is available for programming multi-destination entries (as both switches in a vPC configuration program duplicate entries), according to embodiments of communication system 10, substantially all available space may be programmed with distinct multi-destination entries appropriately. According to example broadcast forwarding table 32, substantially all available space (e.g., allocated to 0 to 4k–1 entries) may be programmed by elected forwarder switch 16(2); VIF 10 may be programmed for example VLAN 100 at OIFs eth 101/1/1 and eth 101/1/32, corresponding to host interfaces with hosts 14(1) and 14(5), respectively. Although example tables 30 and 32 are illustrated in table format, with rows and columns, the content of example tables 30 and 32 may be stored in any appropriate array, arrangement, group, set, or other suitable format, based on particular needs. In embodiments where the hardware supports not more than one multi-destination table, tables 30 and 32 may be implemented as a single table.

Figure 4:
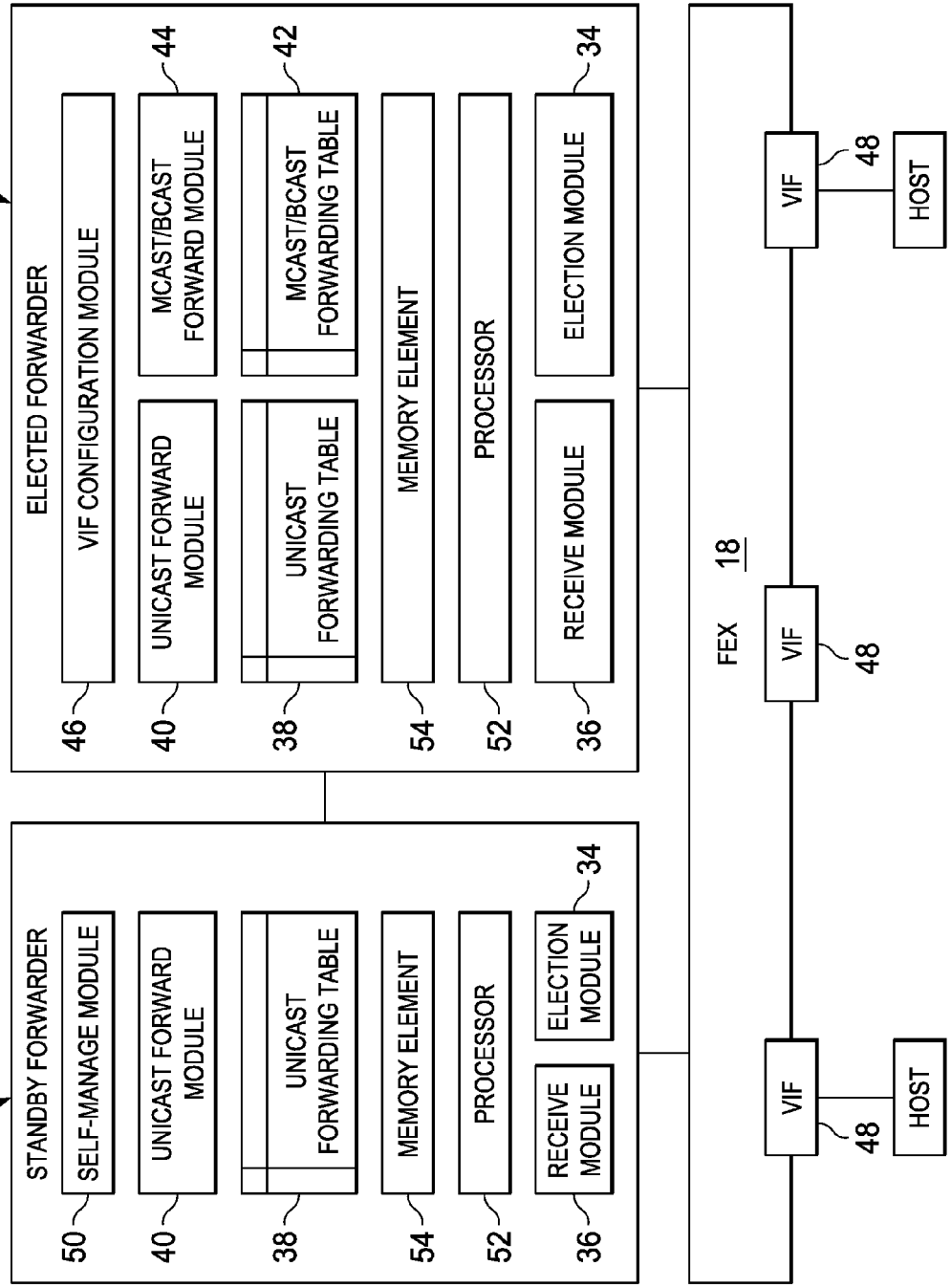
FIG. 4 is a simplified block diagram illustrating yet other example details of the communication system in accordance with one embodiment.

Turning to FIG. 4, FIG. 4 is a simplified block diagram illustrating example details of communication system 10 according to an embodiment. Standby forwarder switch 16(1) and elected forwarder switch 16(2) may include an election module 34. In some embodiments, election module 34 may be configured by a user, for example, a network administrator or system administrator. In other embodiments, election module 34 may be configured to negotiate among switches 16(1) and 16(2), determine vPC roles, or other election criteria and elect one of switches 16(1) and 16(2) as the elected forwarder. Switches 16(1) and 16(2) may include a receive module 36 configured with appropriate network interfaces to receive packets. Standby forwarder switch 16(1) and elected forwarder switch 16(2) may each include a Unicast forwarding table 38 and a Unicast forward module 40 for forwarding Unicast packets appropriately.

Elected forwarder switch 16(2) (but not standby forwarder switch 16(1)) may include one or more multicast/broadcast forwarding table(s) 42, and a multicast/broadcast forward module 44 for forwarding multi-destination packets appropriately. Standby forwarder switch 16(1) may merely pass the multi-destination packet to elected forwarder switch 16(2) for forwarding as appropriate. A VIF configuration module 46 in elected forwarder switch 16(2) may configure VIFs 48 in FEX 18 appropriately, for example, to receive multi-destination packets in specific multicast groups or specific VLANs, suitably. VIFs 48 may be connected to one or more hosts. A self-manage module 50 in standby forwarder switch 16(1) may facilitate storing VIF configuration information locally in switch 16(1), without programming FEX 18.

According to various embodiments, switch 16(1) may include multicast/broadcast forward module 44 that may not be operational (e.g., sleeping mode) when switch 16(1) functions as the standby forwarder. Moreover, switch 16(1) may also save a copy of multicast/broadcast forwarding table(s) 42 in a local cache. If the elected forwarder were to become non-operational, multi-destination VIF information stored in the local cache may be programmed on FEX 18 and the sleeping mode multicast/broadcast forward module 44 may be switched to operational mode.

Figure 5:
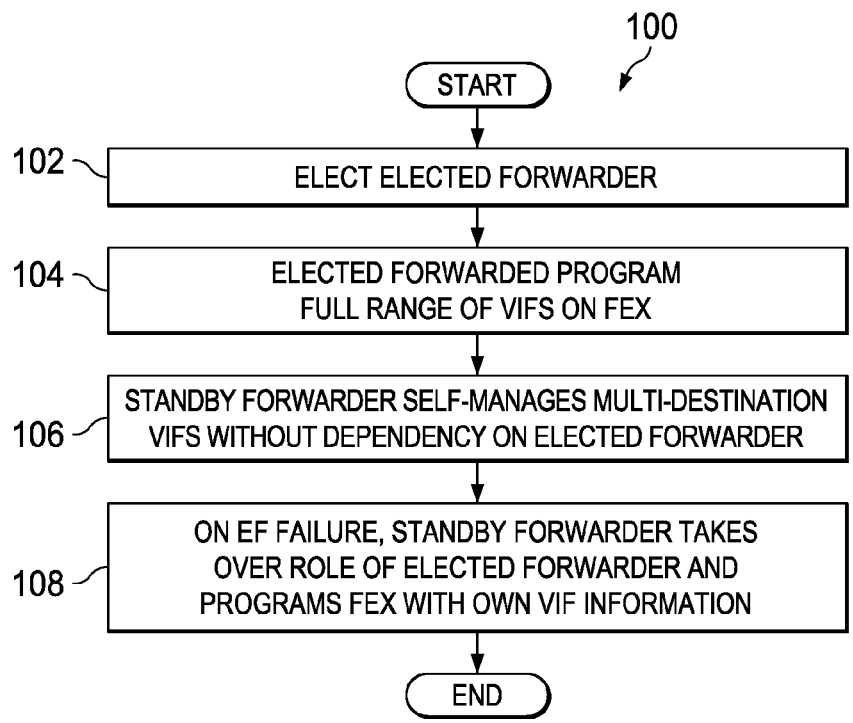
FIG. 5 is a simplified flow diagram illustrating example operational activities that may be associated with embodiments of the communication system.

Turning to FIG. 5, FIG. 5 is a simplified flow diagram illustrating example operations that may be associated with embodiments of communication system 10. Operations 100 may include 102, at which the elected forwarder (e.g., switch 16(2)) may be elected. In some embodiments, the election may be performed by a network or system administrator. In other embodiments, switches 16(1) and 16(2) may negotiate and elect the elected forwarder among them, for example, based on the preconfigured vPC roles, with the primary role being elected as the elected forwarder.

At 104, the elected forwarder (e.g., switch 16(2)) may program full range (e.g., substantially all available space, for example, 4K entries) of VIFs on FEX 18. At 106, the standby forwarder (e.g., switch 16(1)) may self-manage multi-destination VIFS (e.g., forwarding to the elected forwarder the multi-destination traffic intended to go through FEX 18) without dependency on the elected forwarder. At 108, of failure of the elected forwarder (EF), the standby forwarder may take over the role of the elected forwarder and program FEX 18 with its locally cached multi-destination VIF information.

Figure 6:
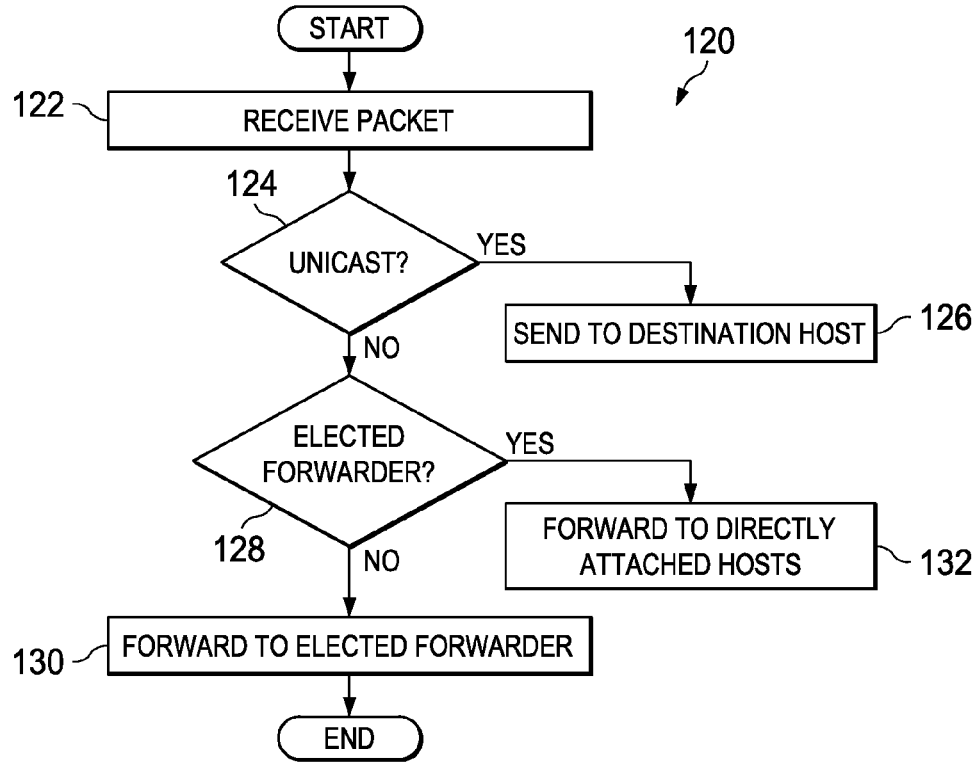
FIG. 6 is a simplified flow diagram illustrating other example operational activities that may be associated with embodiments of communication system.

Turning to FIG. 6, FIG. 6 is a simplified flow diagram illustrating example operations 120 that may be associated with embodiments of communication system 10. At 122, a packet may be received at switch 16(1). At 124, a determination may be made if the packet is a Unicast packet. If the packet is a Unicast packet, at 126, the packet may be sent to the destination host specified therein. If the packet is not a Unicast packet, a determination may be made at 128 whether switch 16(1) is an elected forwarder. If switch 16(1) is not an elected forwarder, the packet may be forwarded to the elected forwarder (e.g., switch 16(2)) at 130. If switch 16(1) is an elected forwarder, the packet may be sent to directly attached hosts on FEX 18 at 132.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of an executable file comprising instructions that can be understood and processed on a computer, and may further include library modules loaded during execution, object files, system files, hardware logic, software logic, or any other executable modules.

In example implementations, at least some portions of the activities outlined herein may be implemented in software in, for example, switches 16(1)-16(2) and FEX 18. In some embodiments, one or more of these features may be implemented in hardware, provided external to these elements, or consolidated in any appropriate manner to achieve the intended functionality. The various network elements (e.g., switches 16(1)-16(2), FEX 18) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, switches 16(1)-16(2) and FEX 18 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 54) can store data used for the operations described herein. This includes the memory element being able to store instructions (e.g., software, logic, code, etc.) in non-transitory computer readable media, such that the instructions are executed to carry out the activities described in this Specification. A processor can execute any type of instructions associated with the data to achieve the operations detailed herein in this Specification. In one example, processors (e.g., processor 52) could transform an element or an article (e.g., data) from one state or thing to another state or thing.

In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory computer readable storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
receiving a packet at a pair of switches comprising a first switch and a second switch in a network environment, wherein the first switch is configured as an elected forwarder, and the second switch is configured as a standby forwarder, wherein a fabric extender (FEX) is connected to the first switch and the second switch with a virtual PortChannel (vPC); and
forwarding the packet to a host connected to the FEX, wherein the elected forwarder is configured with substantially all multi-destination virtual interfaces (VIFs) on the FEX in a forwarding table, wherein the elected forwarder programs the FEX with the multi-destination VIFs.

2. The method of claim 1, wherein the standby forwarder forwards the packet to the elected forwarder.

3. The method of claim 1, wherein the elected forwarder is elected based on a vPC role.

4. The method of claim 3, wherein a primary role is elected as the elected forwarder.

5. The method of claim 1, wherein the first switch and the second switch do not perform a VIF synchronization.

6. The method of claim 1, wherein the standby forwarder self-manages multi-destination VIFs without a dependency on the elected forwarder.

7. The method of claim 1, wherein upon failure of the elected forwarder, the standby forwarder takes on a role of the elected forwarder and programs the FEX with its locally cached multi-destination VIFs.

8. The method of claim 1, wherein a scale of allowed multi-destination groups supported for FEX interfaces is approximately doubled.

9. The method of claim 1, wherein a connection from the host through the FEX is configured as an internal vPC in the FEX.

10. One or more non-transitory tangible media encoding logic that includes instructions for execution and when executed by a processor, is operable to perform operations comprising:
receiving a packet at a pair of switches comprising a first switch and a second switch in a network environment, wherein the first switch is configured as an elected forwarder, and the second switch is configured as a standby forwarder, wherein a fabric extender FEX is connected to the first switch and the second switch with a virtual PortChannel vPC; and
forwarding the packet to a host connected to the FEX, wherein the elected forwarder is configured with substantially all multi-destination virtual interfaces VIFs on the FEX in a forwarding table, wherein the elected forwarder programs the FEX with the multi-destination VIFs.

11. The media of claim 10, wherein the standby forwarder forwards the packet to the elected forwarder.

12. The media of claim 10, wherein the elected forwarder is elected based on a vPC role.

13. The media of claim 10, wherein the standby forwarder self-manages the multi-destination VIFs without a dependency on the elected forwarder.

14. The media of claim 10, wherein a connection from the host through the FEX is configured as an internal vPC in the FEX.

15. An apparatus, comprising:
a first switch;
a second switch;
a memory element for storing data; and
a processor that executes instructions associated with the data, wherein the processor and the memory element cooperate such that the apparatus is configured for:
receiving a packet, wherein the first switch is configured as an elected forwarder, and the second switch is configured as a standby forwarder, wherein a fabric extender FEX is connected to the first switch and the second switch with a virtual PortChannel vPC; and
forwarding the packet to a host connected to the FEX, wherein the elected forwarder is configured with substantially all multi-destination virtual Interfaces VIFs on the FEX in a forwarding table, wherein the elected forwarder programs the FEX with the multi-destination VIFs.

16. The apparatus of claim 15, wherein the standby forwarder forwards the packet to the elected forwarder.

17. The apparatus of claim 15, wherein the elected forwarder is elected based on a vPC role.

18. The apparatus of claim 15, wherein a connection from the host through the FEX is configured as an internal vPC in the FEX.

* * * * *